L. W. MYRICK.
GRINDING MACHINE FOR BAND SAWS.
APPLICATION FILED OCT. 1, 1913.

1,104,698.

Patented July 21, 1914.
2 SHEETS—SHEET 1.

Witnesses

Inventor
L. W. Myrick
By
Attorneys

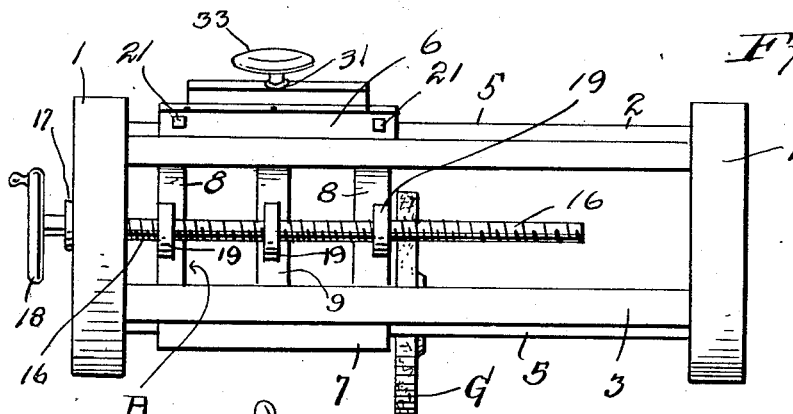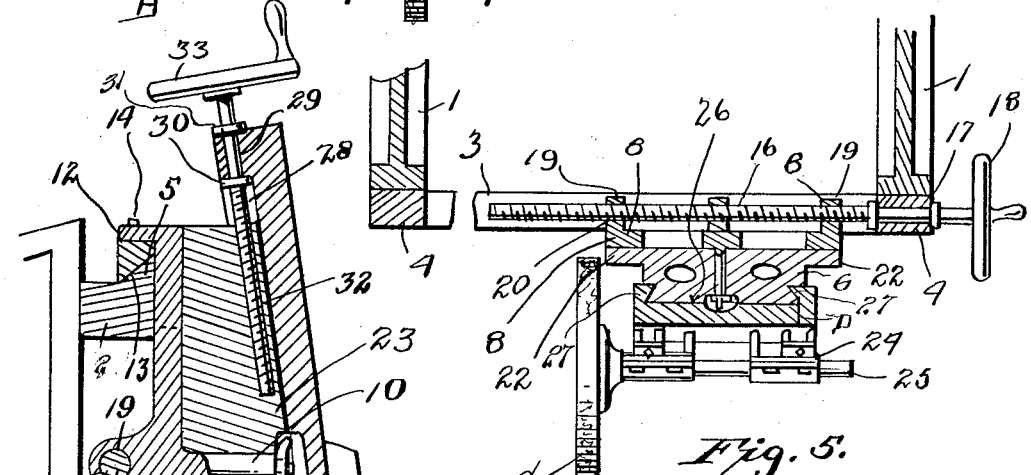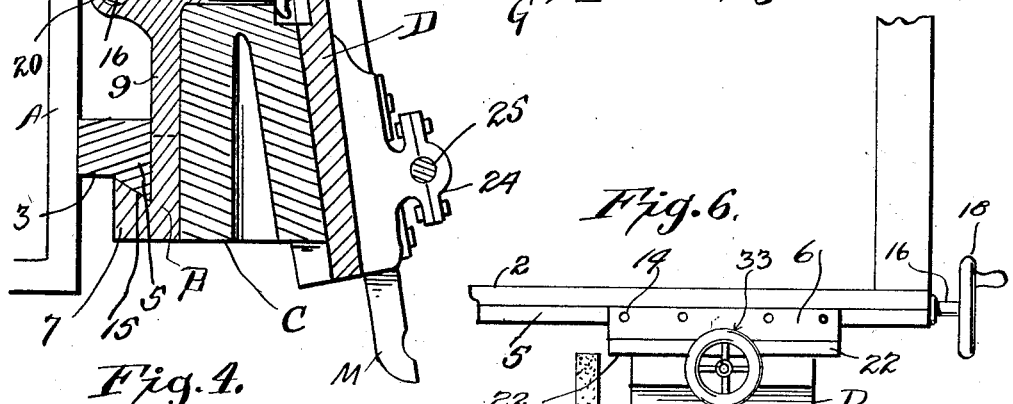

UNITED STATES PATENT OFFICE.

LESTER W. MYRICK, OF GARDINER, OREGON.

GRINDING-MACHINE FOR BAND-SAWS.

1,104,698.  Specification of Letters Patent.  Patented July 21, 1914.

Application filed October 1, 1913. Serial No. 792,827.

*To all whom it may concern:*

Be it known that I, LESTER W. MYRICK, a citizen of the United States, residing at Gardiner, in the county of Douglas, State of Oregon, have invented certain new and useful Improvements in Grinding-Machines for Band-Saws; and I do hereby declare the following to be a full, clear, and exact description of the invention, such as will enable others skilled in the art to which it appertains to make and use the same.

This invention relates to certain novel and useful improvements in a machine for grinding band saw wheels.

As is well known, the wheels over which the endless band saw travels become worn, and therefore tend to interfere with the proper running of the band. In order to true these wheels so that the band saw may operate efficiently, it is necessary to regrind such wheels.

In carrying out my invention it is my purpose to provide a mechanism by means of which the wheels may be rapidly and accurately ground to reproduce true faces or peripheries.

Still a further object of the invention is the provision of a machine wherein the grinding wheel is carried by the frame in such manner that it may be adjusted either vertically or laterally relative to the surface of the wheel being ground.

Furthermore, I mount the grinding wheel in such manner that it may be employed to grind one of the band wheels, for instance the bottom wheel, and then reversed to grind the other or top band wheel without changing or disturbing the frame.

It is also my purpose to so construct and mount the supporting mechanism of the grinding wheel that the latter when moved vertically downward will be shifted outward so as to bring it into juxtaposition to the vertical center line of the band wheel being ground.

With the above recited objects and others of a similar nature in view, the invention consists in the construction, combination and arrangement of parts set forth in and falling within the scope of the appended claims.

Figure 1:
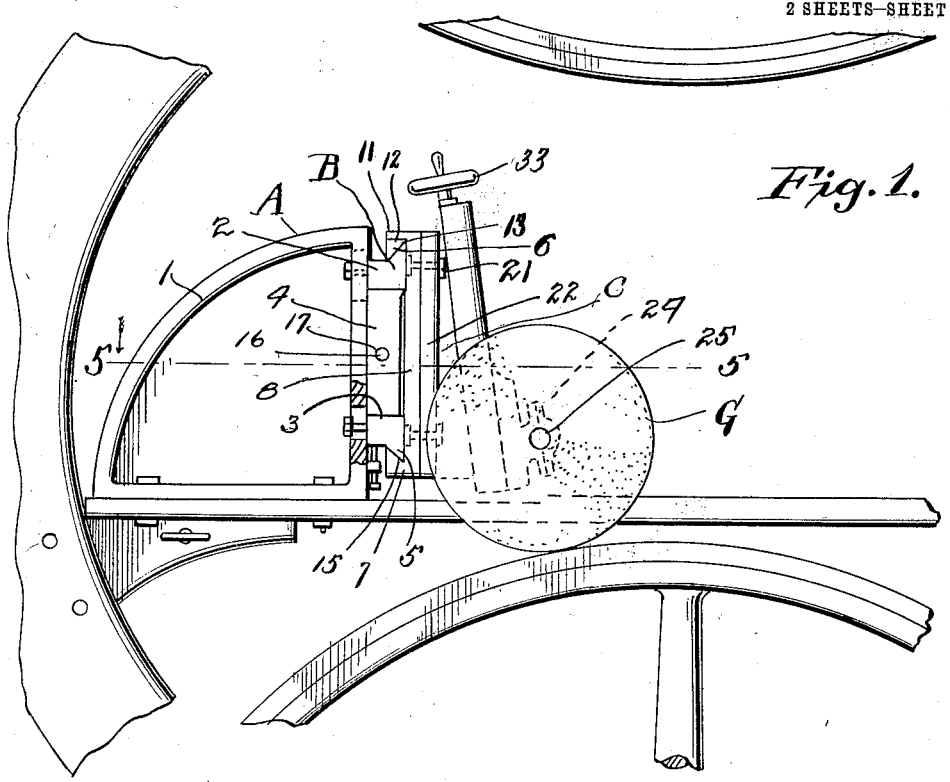
Figure 2:
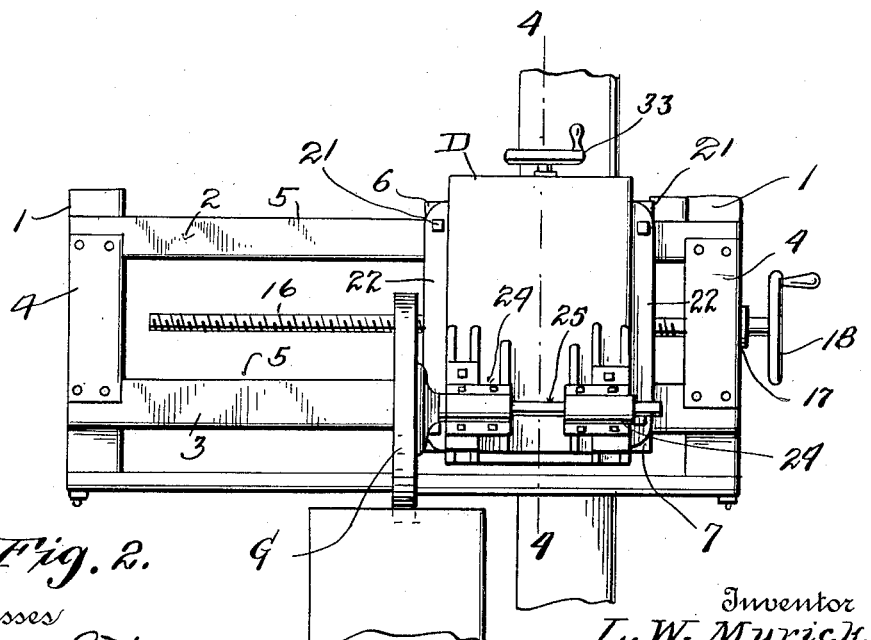

In the accompanying drawings: Figure 1 is a view in side elevation of a grinding mechanism embodying my invention, and showing the same mounted in grinding position, relative to the bottom band wheel. Fig. 2 is a front view of the same. Fig. 3 is a rear view. Fig. 4 is a vertical sectional view taken on the line 4—4 of Fig. 2. Fig. 5 is a horizontal sectional view taken on the line 5—5 of Fig. 1. Fig. 6 is a top plan view.

In the preferred embodiment of the invention set forth herein, the machine embraces among other features, a support on which is mounted a laterally or horizontally shiftable frame. This latter in turn carries a vertically disposed wedge-shaped frame over which slides a bed plate on which is mounted the bearings for the shaft of the grinding wheel. The construction is such that through mechanism hereinafter described the horizontally shiftable frame may be moved laterally of the support to bring the grinding wheel to a desired position transversely of the band wheel being ground, and the bed plate may be raised or lowered on its frame, at an angle or inclination to move the grinding wheel toward the center vertical line of the band wheel, this angular movement of the bed plate being caused by the inclined or wedge-shape of the frame over which it slides. The wedge-shaped frame is also pivoted centrally to the horizontally shiftable frame so that if it is desired to reverse the position of the grinding wheel, for instance, to bring it from position at the bottom band wheel to the top band wheel, it is only necessary to loosen a few securing bolts and swing the frame on its pivot to such reverse position.

Referring now to the accompanying drawings in detail, the letter A designates the support for the machine which is made up of the side blocks 1—1, carrying the top and bottom rails 2 and 3 connected by the vertical end rails 4. The top and bottom rails 2 and 3 are beveled to form tongues 5 running lengthwise of such rails. Mounted to slide on these rails is a frame B which comprises the top and bottom bars 6 and 7, the vertical side bars 8 and the central web 9 which carries the pivot stud or bolt 10 for the purpose hereinafter described. The top bar 6 projects rearward or beyond the side bars 8 to form a shoulder 11 on which is seated a strip 12 beveled at its lower face as at 13 to interlock in sliding relation with the beveled tongue of the top rail 2. This strip is secured by screws or other fasteners 14. The lower bar 7 is provided with a beveled groove 15 extending longitudinally thereof which is designed to receive the beveled tongue of the lower rail 3. Thus it will be seen that the frame B may slide horizontally on the support, yet is held against detachment therefrom. In order to shift the frame B along the rails 2 and 3 I provide a screw shaft 16 journaled at 17 in the rails 4 and which screw is rotated by means of the hand wheel 18. The rear of the frame B is provided with ears 19 having threaded bores 20 through which the screw shaft 16 extends, so that upon the rotation of the screw the frame B will be shifted, as will be readily understood.

The letter C designates a wedge-shaped frame which is secured to the frame B by means of bolts 21 which pass through the side flanges 22 of the frame C. This frame is provided throughout approximately its length with a vertically inclined, relatively wide dove-tailed projecting wall or plate 23, the outer face of which slopes outward from the top toward the bottom. This frame C is mounted on the pivot stud or bolt 10, so that when it is desired to reverse the frame C relative to the frame B, it is only necessary to remove the bolts 21 and turn the frame C on the pivot 10.

To enable the operator to easily turn or reverse the frame C, I provide a bar M which may be inserted beneath the bearing 24, as shown in Fig. 4, this bar being secured in any suitable manner as by set screws or the like. When it is desired to reverse the frame C this bar may be grasped with one hand and the hand wheel 33 grasped with the other hand and the frame C easily turned upon the pivot 10. It will thus be noted that the bar M constitutes a handle for enabling the grinding wheel to be easily reversed.

Sliding vertically over the dove-tailed projecting wall or plate 23 is a bed plate D carrying the bearings 24 for the shaft 25 of the grinding wheel G. These bearings are preferably located at the bottom or lower portion of the bed plate. The rear face of the bed plate is formed with a relatively wide longitudinally extending dove-tailed groove 26 which terminates short of the upper end of the plate and which forms a slide way for the dove-tailed plate or wall of the frame C, the flanges 27 at the side edges of the groove 26 bearing against the frame C.

In order to feed or slide the bed plate D up and down in the frame C I provide a screw shaft 28 which extends through the vertical bore 29 in the top cross wall of the bed plate, this shaft being rotatable in such bore, but is held against longitudinal movement relative to the bed plate D by the collars 30 and 31 pinned on the shaft at points above and below the ends of the bore. The frame C is provided with a longitudinal threaded bore 32 for the reception of the screw shaft 28. The upper end of the latter is provided with a hand wheel 33. From this construction it will be seen that when the hand wheel is turned by means of the handle thereon the bed plate carrying the grinding wheel will be moved up or down, as the case may be, and at an inclination to the vertical. Thus when it is desired to move the grinding wheel toward the center line drawn vertically through the band wheels the hand wheel is operated to slide the bed plate downward and outward, while when it is intended to retract the grinding wheel the hand wheel is turned to slide the frame upward and inward.

From the above description, taken in connection with the accompanying drawings, the construction and manner of employing my invention will be readily understood. As above pointed out, the grinding wheel may be moved transversely of the periphery of the wheel being ground by operating the hand wheel 18, and at the same time such wheel may be adjusted toward the center vertical line of the wheel being ground by operating the hand wheel 33.

While I have herein shown and described one particular embodiment of my invention, I wish it to be understood that I do not confine myself to all the precise details of construction herein set forth by way of illustration, as modification and variation may be made without departing from the spirit of the invention, or exceeding the scope of the appended claims.

What I claim is:

1. The combination with a support, of a frame slidable laterally upon the support and provided with a pivot shaft, a second vertically disposed frame pivotally mounted upon the pivot shaft, said second frame having an outer inclined face, a bed plate mounted to slide vertically on the outer inclined face of the second frame, means including an operating screw rotatably mounted in the upper portion of the bed plate and vertically movable in a threaded socket in the second frame for moving the bed plate vertically on the second frame, and a grinding wheel mounted in bearings upon the outer face of the bed plate.

2. The combination with a support, of a frame slidable laterally upon the support and carrying a pivot shaft, a wedge-shaped frame mounted upon the pivot shaft, a bed plate sliding at an angle on the wedge-shaped frame, a bearing screw rotatably mounted in the top portion of the bed plate and vertically movable in the wedge-shaped frame and adapted when actuated to shift the bed plate vertically on the wedge-shaped frame, and a grinding wheel carried in adjustable bearings on the bed plate.

3. The combination with a support, of a frame slidable laterally thereon and provided with a pivot shaft, a second frame mounted to turn on the pivot shaft and provided with an inclined guide face, a bed plate vertically slidable over in the inclined guide face of the second frame, a grinding wheel carried by the bed plate, means for shifting the first frame bodily on the support to move the grinding wheel laterally of the wheel being ground and means for sliding the vertical bed plate to shift said grinding wheel toward and from the center line of the wheel being ground.

In testimony whereof, I affix my signature, in the presence of two witnesses.

LESTER W. MYRICK.

Witnesses:
J. F. JOHNSTON, Jr.,
WM. S. ANGUS.

Copies of this patent may be obtained for five cents each, by addressing the "Commissioner of Patents, Washington, D. C."